Patented Dec. 13, 1927.

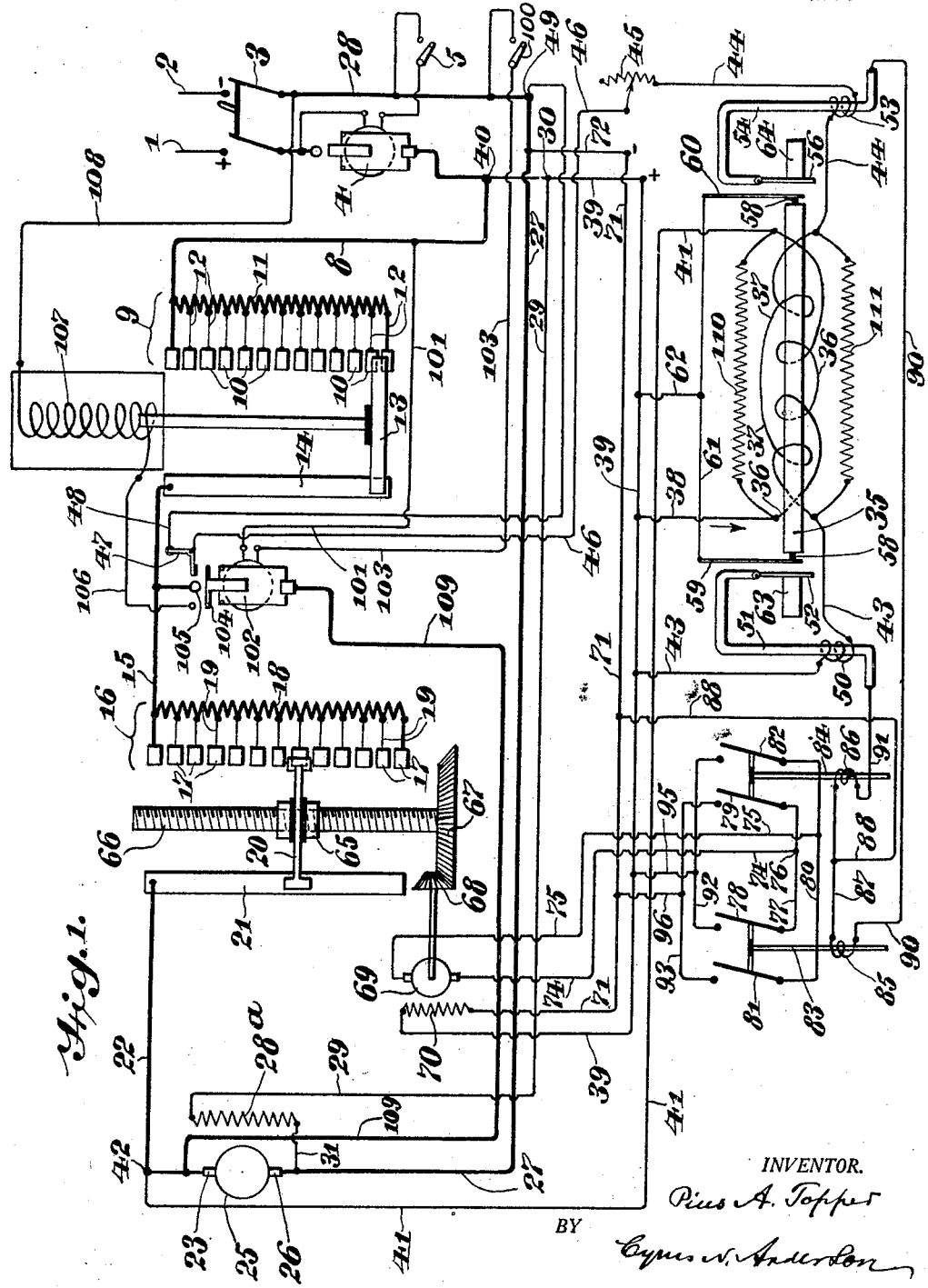

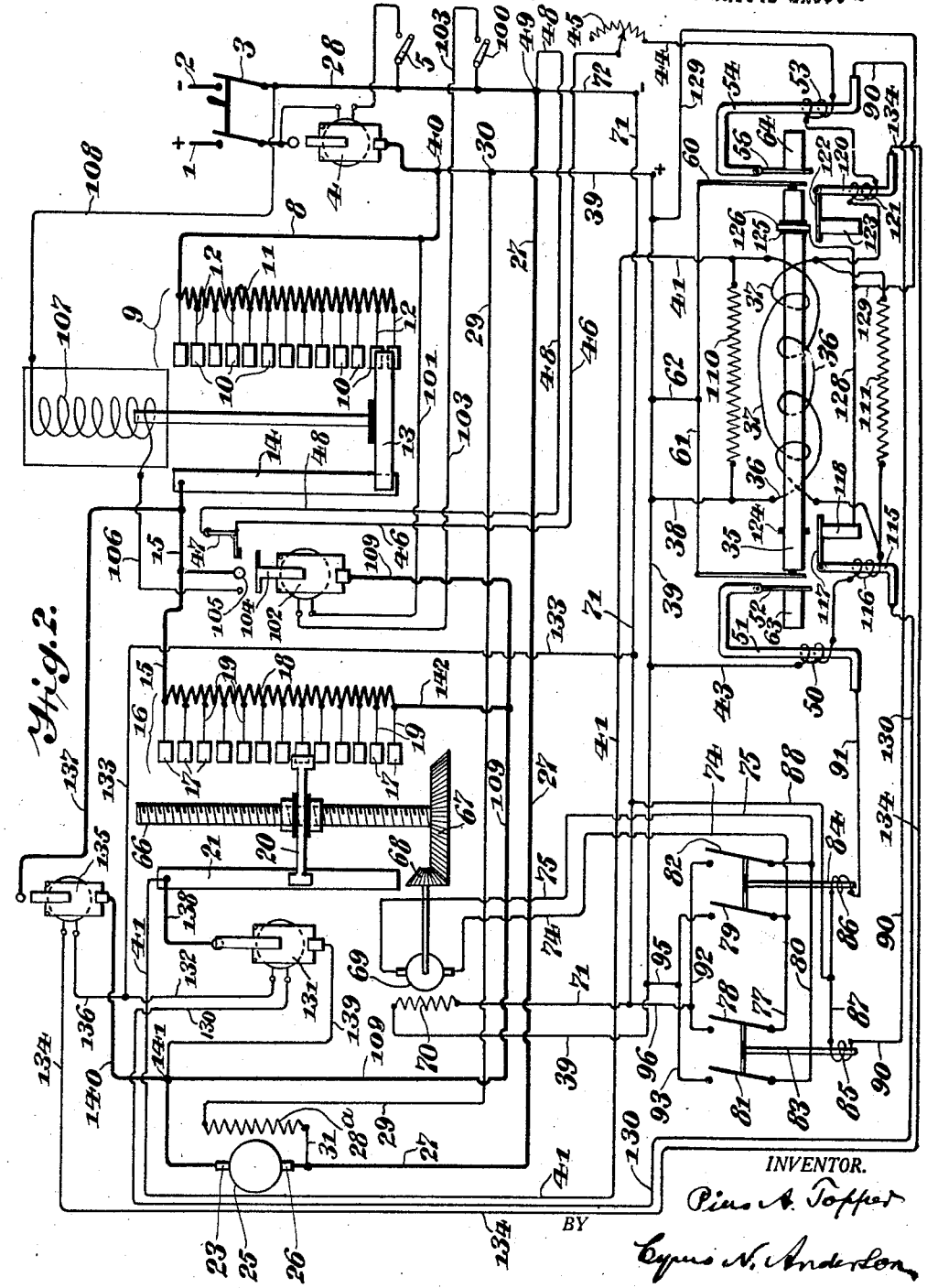

1,652,220

UNITED STATES PATENT OFFICE.

PIUS A. TOPPER, OF PHILADELPHIA, PENNSYLVANIA, ASSIGNOR TO DILL AND COLLINS CO., OF PHILADELPHIA, PENNSYLVANIA, A CORPORATION OF PENNSYLVANIA.

CONTROLLING MEANS FOR ELECTRICAL APPARATUS.

Application filed March 16, 1925. Serial No. 15,862.

My invention relates broadly to means for controlling the operation of electrical apparatus. The invention is capable of general application and may be employed in connection with motors and generators. I have shown the same herein as employed in connection with a direct current shunt motor for the purpose of causing the motor to operate at a predetermined rate of speed under variable load conditions. As indicated, however, the invention is applicable to and is adapted to be employed in connection with alternating current slip ring motors and may also be employed in connection with two or more shunt motors for maintaining the same at synchronous speed regardless of varying load conditions.

The general object of the invention is to provide novel means whereby the speed of a motor is maintained at a constant rate under varying load conditions.

It is also an object of the invention to provide novel means whereby upon a variation of the back electromotive force of a motor the resistance conditions of the armature circuit are changed so as to re-establish normal conditions of operation under which the armature of the motor is rotated at the predetermined speed required.

Another object of the invention is to provide a novel construction of regulating or controlling means which normally is inactive but which upon a variation in the speed of rotation of the armature of the motor is caused to operate to recondition the supply line whereby the speed of rotation of the motor armature is returned to normal.

A further object of the invention is to provide a controlling device having means whereby upon variation of the load conditions upon a motor to cause a change in the speed of rotation of the armature thereof means is actuated to vary the condition of the main circuit leading to the motor armature whereby the speed of rotation of the latter is returned to normal.

Other objects of the invention will be pointed out in the detailed description thereof which follows or will be apparent therefrom.

In order that the invention may be readily understood reference should be had to the accompanying drawings in which I have illustrated certain convenient forms of embodiment of the invention.

In the drawings:

Fig. 1 is a schematic view of an apparatus embodying the invention; and

Fig. 2 is a similar view comprising certain supplemental features of construction.

Referring to the drawings: 1 and 2 designate the main supply lines for supplying current to the apparatus, the line 1 being positive and the line 2 negative. A switch 3 controls the flow of current from these lines into the apparatus. A further control is effected by means of a magnetic switch device 4 which is adapted to be controlled by a switch 5. The line 1 has connection through the magnetic switch 4 with a line 8 which is connected with an armature resistance 9 comprising contacts 10, a resistance wire 11 and connections 12 between the said contacts 10 and adjacent opposing portions of the resistance 11. The contacts 10 are adapted to be connected through a movable bar 13 with a contact bar 14. The latter is connected by means of a conducting wire 15 with a second armature resistance 16 having contacts 17 and a resistance wire 18. The contacts 17 are separately connected to the resistance wire 18 by means of connecting wires 19. An adjustable connecting bar 20 is adapted to contact at one end with the contacts 17 and at its opposite end slidably with a bar 21 the upper end of which is connected by means of a conductor 22 and a contact 23 with the armature of a motor 25. Current having passed through the armature is conducted therefrom through the contact 26 and conducting lines 27 and 28 to the negative side 2 of the main supply lines. Full line voltage is supplied to the shunt field 28$^a$ of the motor 25 through the line 29 having connection at 30 to the positive side of the main line supply. The opposite side of the shunt field is connected by a line 31 to the line 27 having connection with the negative side of the line supply.

It may be assumed that with the parts as thus far described positioned as shown it is desired that the armature of the motor 25 shall rotate at a constant speed under varying load conditions. In order to accomplish that desired end I have provided a regulator or regulating means to which I shall now refer in detail.

The said regulator or regulating means comprises a bar 35, of metal, which is adapted to be magnetized and about which are wound two coils 36 and 37 in opposite directions so that the effects of current flowing therethrough may be employed to control the speed of rotation of the armature of the motor 25 under conditions stated.

The coil 36 is connected at one end by means of a conductor 38 with a conductor 39 having connection at 40 with the conducting line 8. The opposite end of the coil 36 is connected by means of a conductor 41 to the line 22 at 42. It will be seen, therefore, that the terminals of the coil 36 are connected in shunt across the entire armature resistance of the apparatus.

The coil 37 is connected at one end by means of a conductor 43 to the line 39 and at its opposite end is connected by a conductor 44 to a rheostat 45 which in turn is connected through the conductor 46, movable contact 47 and conductor 48 with the negative side of the line at 49. The conductor 43 is provided with a coil 50 which extends around the angular bar 51 in a direction such that the depending pivoted armature 52 is at all times of positive polarity; likewise the conductor 44 is provided with a coil 53 which extends around the angular bar 54 in a direction such as to cause the depending pivoted armature 56 to be always of a positive polarity.

The bar 35 is provided at its opposite ends with pins 58 of insulating material with which the lower ends of the conducting members 59 and 60 are in contact. The upper ends of these members are connected to a conductor 61 which in turn is connected by a conductor 62 to the positive line 39 previously referred to. The presence of the pins 58 prevents contact of the conducting members 59 and 60 with the opposite ends of the bar 35. Located in alinement with said bar and in spaced relation to the opposite ends thereof are bars or blocks 63 and 64 of magnetic metal, such as iron, against the inner ends of which the armatures 52 and 56 are normally in contact, as shown. For the purpose of adjusting the bar 20 so as to vary its position with respect to the contacts 17 and the contact bar 21 I have mounted the said bar 20 upon a nut 65 which is in screw threaded engagement with a rotatable shaft 66. The said shaft is provided upon its lower end with a bevel gear 67 with which a bevel pinion 68 is in engagement. The said pinion is mounted upon the armature shaft of a motor 69, the shunt field of which is indicated at 70. One side of the field 70 is connected to the line 39 while the opposite side thereof is connected to a conducting line 71 which in turn is connected by a connecting conductor 72 to the negative side of the current supply line. Current for causing operation of the motor 69 is adapted to be supplied to the armature thereof through the conductors 74 and 75.

At its outer end the conductor 74 has connection at 76 to a conductor 77 one end of which is connected to one member 78 of a switch structure while the opposite end thereof is connected to one member 79 of another switch structure. The outer end of the conductor 75 is connected to a conductor 80 one end of which is connected to the member 81 of the first named switch structure, while the opposite end of said conductor is connected to the member 82 of the second named switch structure. The switch structures comprising the members 78 and 81, and 79 and 82 are adapted to be actuated by the energizing of iron bars or cores 83 and 84. These bars are energized by the passage of current through coils 85 and 86 which extend around the same. One end of one of these coils is connected by a conductor 87 to one end of the other coil. Said conductor is connected by means of a conductor 88 to the line 71 which in turn is connected to the negative side of the line. The opposite end of the coil 85 is connected by a conductor 90 to the angular bar or member 54 previously referred to, while the opposite end of the other of said coils is connected by a conductor 91 to the angular bar or member 51.

Upon energizing of the bar 83 the switch structure, comprising the members 78 and 81, is switched so that the member 78 contacts with one end of a conductor 92 while the member 81 contacts with one end of a conductor 93. If current should flow through the coil 86 to energize the bar or core 84 the switch structure comprising the members 79 and 82 would be switched or adjusted so as to cause the member 79 to contact with the opposite end of the conductor 93 while the member 82 would be caused to contact with the opposite end of the conductor 92. The conductor 92 is connected by a conductor 95 to the positive line 39 while the conductor 93 is connected by the conductor 96 to the negative line 71.

With the switch structure just described in the positions shown it is apparent that the motor at 69 is inactive and that no movement of the movable or adjustable contact bar 20 is taking place. It should be noted here that the rheostat 45 and other parts of the apparatus are adjusted so as to effect rotation of the armature of the motor 25 at some desired speed less than its full rated speed and so that the strengths of the currents flowing through the coils 36 and 37 are the same. As long as there is no variation in the load imposed upon the armature of the motor 25 and consequently no change in the conditions of operation the parts will remain in the position as shown in the drawings, but assume that the load imposed upon the armature shaft should be increased so as to increase the resistance to be overcome by the motor thereby causing a decrease in the speed of rotation,—such decrease will result in a decrease in the number of lines of force cut by the armature windings with the result that the back electro-motive force of the motor will be decreased. A decrease in the back electro-motive force causes an increase in the voltage drop across the armature resistance and a consequent increase in the flow of current. Such increase of the flow of current causes an increase in the flow of current through the coil 36, as will be obvious. Such increase of flow of current through the said coil results in rendering the right hand end of the bar 35 of south polarity which will react upon the bar 64 to cause the adjacent or near end thereof to become of north polarity. It will be recalled that the armature 56 is maintained at all times positive or of north polarity. It follows therefore that the armature 56 is not only attractive toward the adjacent end of the bar 35, which is of south polarity, but is also repelled by the north polarity upon the adjacent end of the bar or block 64. Movement of the armature 56 toward the left causes it to contact with the conductor 60. Upon contact being made between the armature 56 and the conductor 60 current will flow from the line 39 through 62, 61, 60, 54, 90, the coil 85, line 87 and line 88 to the conductor line 71 and thence to the negative side of the supply line. Flow of current through the coil 85 actuates the switch structure comprising the members 78 and 81 so as to cause the said members to contact respectively with the ends of the conductors 92 and 93. Such contact having been made current will flow from the line 39 through the conductors 95 and 92, switch member 78, thence through the conductors 77 and 74 to the armature of the motor 69 and from the latter through the conductor 75 to the conductor 80 to the switch member 81, the conductor 93 and through the conductor 96 to the line 71 and thence to the negative side of the supply line. Passage of the current through the armature of the motor 69 causes rotation of the former to effect rotation of the member 66 in a direction to adjust the adjustable contact bar 20 in a direction to cut out resistance so as to reduce the voltage drop between the conductor 8 and the point 42. Movement or adjustment of the bar 20 will continue until magnetic balance between the coils 36 and 37 is restored. In other words, such adjustment of the bar 20 is continued until the bar 35 is without magnetic effect.

If the load imposed upon the armature shaft should be decreased the armature would rotate at greater speed and consequently would increase the back electro-motive force thereby causing a less flow of current through the armature and also causing a drop in voltage between the line 8 and the point 42. Such a change in the conditions decreases the flow of current through the coil 36 below the normal flow therethrough so that the fixed current which flows through the coil 37 becomes greater than that which flows through the coil 36, with the result that the bar 35 becomes magnetized with the left hand end thereof of south polarity. Such left hand end being of south polarity the armature 52 is caused to contact with the conducting member 59. Upon contact of the armature with the member 59 current flows from 39 through 62, 61, 59, 51, 91, coil 86 and conductor 88 to the line 71. Flow of current through the coil 86 magnetizes the bar 84 and shifts the switch comprising the members 79 and 82 into position with the said members in contact respectively with the adjacent ends of the conductors 93 and 92. The switch comprising the members 79 and 82 having been thus shifted current is caused to flow through the armature of the motor 69 in a direction opposite to that as previously described, with the result that the shaft 66 is rotated in an opposite direction so as to move the contact bar 20 in a direction to "cut in" resistance and thereby increase the voltage drop between the line 8 and the point 42. As in the previous case, this operation will continue until the original voltage drop value is restored between the points 8 and 42 which will restore magnetic balance between the coils 36 and 37 to effect de-energizing of the cores or bars 35, 63 and 84. The armature 52 returns to its original or normal position as shown in the drawings and the apparatus continues to operate at the predetermined speed as desired.

It will be understood that the rheostat 45 may be adjusted so that currents of different strengths or values will flow through the coil 37 thereby requiring currents of different strengths or values to flow through the coil 36 to counterbalance the variations in magnetism produced in the core 35 by variations in the strength of current which may flow through the coil 37 depending upon the adjustment of the rheostat.

In cases where the controlling devices are set so as to provide for low speed of operation of the armature of the motor 25 it may be desirable, if not necessary, in starting the motor against heavy loads from rest to cause it to exert the full force of which it is capable to cut out the armature resistance means or elements. By doing this the starting of the motor will be facilitated. In order to cut out resistance and also to cut out the controller or controlling means hereinbefore described I have provided a switch 100 which is adapted to be closed to cause current to flow from the line 8 through a line 101 to a magnetic switch at 102 and from the latter through a line 103 and the switch 100 to the negative side of the main supply line. The energizing of the switch 102 causes movement of a movable contact member 104 into contact with a contact member 105 having connection with the line 15 and also into contact with one end of a conducting line 106 for supplying current to a coil 107. The opposite end of the coil is connected to a conducting line 108 having connection at its outer end with the negative side of the main supply line. The movable contact member 104 also contacts with the contact member 47 previously referred to so as to disengage or disconnect the same from the line 48 thereby disrupting or breaking the circuit including the rheostat 45 to which reference has been previously made. Upon contact of the contact member 104 with the contact 105 the circuit through the armature of the motor 25 is completed through the line 8, the armature resistance 9, the bar 13, a portion of the line 15, thence through the magnetic switch 102, and the conductor line 109 to the armature of the motor 25. At such time, however, current flows through the coil 107 as a result of which the slidable or adjustable contact bar 13 is caused to move upwardly so as to cut out the resistance element of the armature resistance 9 so that immediately the motor is caused to exert the full torque of which it may be capable.

The motor having been started the switch 100 may be opened, whereupon the parts resume the normal condition for which they have been set for operating the motor at a selected constant speed less than its rated speed.

Resistance discharge means 110 and 111 are provided between the terminals or opposite ends of the coils 36 and 37.

The means as thus far described for controlling the operation of a motor and for maintaining the rotation of the armature thereof at a predetermined or selected constant speed is satisfactory in cases where the variations in load conditions and consequently speeds of rotation are relatively small, but in cases where the changes are relatively great it is desirable that means be provided whereby normal conditions of operation may be brought about quickly.

It will be apparent from what has been said already that in the case of a change in load conditions and a consequent change in the speed of rotation of the armature of the motor from the speed selected it is necessary that the adjustable member 20 move through the necessary distance with respect to the armature resistance 16 in one direction or the other in order to effect return of the armature of the motor to normal speed conditions. If the change in speed has been great the adjustment of the part 20 may require a considerable period of time. In the meantime harmful results may have ensued. It is desirable, therefore, that means be provided for effecting a quick return of the apparatus to normal conditions of operation. In Fig. 2 of the drawings, in addition to the mechanism or means shown in Fig. 1, I have also shown additional or supplemental mechanism or means by the employment of which the speed of rotation of the armature of the motor may be returned to the normal or selected speed quickly without waiting for the adjustment of the adjustable contact bar 20 to be effected. The additional mechanism or means comprises a bar 115 of iron or other suitable metal about which a coil 116 is wound, said coil being interposed between the coil 50 and the coil 37. The upper end of the bar 115 terminates a distance from one end of the bar 35 previously referred to and described. Pivoted to the upper end of the bar 115 is an armature 117 which rests upon a metal bar or block 118. At the opposite end of the controlling means a second bar 120 is provided about which a coil 121 is wound. This coil is located between the opposite end of the coil 37 and the coil 53 previously referred to. The upper end of the bar 120 terminates in adjacent relation to the opposite end of the bar 35 of the controller. Pivoted to the upper end of the bar 120 is an armature 122 which rests upon an iron bar or block 123. The coils 116 and 121 are wound in directions about the bars 115 and 120 to cause the armatures 117 and 122 to be at all times positive or of north polarity.

In order to prevent the armature 117 from contacting with the bar 35 when the latter is of south polarity I have provided a fiber pin 124 the lower end of which projects a distance from the bar 35. In case of upward movement of the armature 117 it contacts with the lower end of the said pin and not with the bar 35. I have provided a ring 125 of insulating material about the bar 35 adjacent its opposite end upon which ring I have mounted a metal ring 126 with which the armature 122 is adapted to contact. Movement of the armature 122 takes place toward the adjacent end portion of the bar 35 when it is negative or of south polarity.

It will be noted that the weight of the armatures 117 and 122 must be overcome in order to effect movement thereof toward the adjacent end portions of the bar 35. A greater force, therefore, is required to cause movement of the armatures 117 and 122 than is required to effect movement of the armatures 52 and 56. From this it follows that when there are only slight variations in the speed of rotation of the armature of the motor 25 return to normal selected speed is effected as a result of the movement of either the armature 52 or 56 depending upon conditions without in any way affecting the armatures 117 and 122. If, however, the change in the speed of rotation of the armature of the motor is great a greater amount of current flows through the one or the other of the coils 36 and 37 with the result that the magnetic field surrounding the opposite end portions of the bar 35 is of sufficient strength to cause movement of the armatures 117 or 122. As to which of the said armatures will be moved will depend upon whether the speed of rotation of the armature of the motor 25 has been decreased or increased. That armature which is adjacent an end of the bar 35 which is negative or of south polarity will be moved.

It will be noted that the bar or block of iron 118 is connected by a conductor 128 to the metal contact ring 126 and also that the conductor 128 is connected by a conductor line 129 to the positive line 39 previously referred to.

The bar 115 is connected by a conductor 130 to a magnetic switch 131. Connection is made from the latter through lines 132 and 133 to the negative line 71 previously referred to. The magnetic switch 131 is normally closed.

The bar 120 is connected by a conductor line 134 to a magnetic switch 135 which is normally open. The said switch is connected by conductor lines 136 and 133 to the negative line 71 which has connection with the negative side of the supply line.

Upon completion or closing of the circuit through the magnetic switch 135 the contact member thereof is caused to move into contact with a contact member to which the adjacent end of a conducting line 137 is connected, which line leads from the conducting line 15 previously referred to. As already indicated, the magnetic switch 131 is normally closed so that current flows through the line 15, the resistance 16, adjustable bar 20, stationary contact bar 21, line 138, through the magnetic switch 131, and thence through the line 139 and a portion of the line 109 to one of the brush contacts of the armature of the motor 25 and thence through the line 27 to the negative side of the supply line. The switch 135 is also connected by a line 140 to the line 109 at 141.

If the load should be greatly increased so as to cause a great decrease in the speed of rotation of the armature of the motor 25 a great increase in the flow of current through the coil 36 will result. Such increase in current being very much greater than the current which flows through the coil 37 the right hand end of the bar 35 will become negative or of south polarity. The change of load under the assumption having been greatly increased it will follow that the strength of the magnetic field adjacent or surrounding the right hand end of the bar 35 will be of a strength sufficient to cause movement not only of the armature 56 into contact with the member 60 but will also cause movement of the armature 122 into contact with the contact ring 126. The contact of the armature 122 with the ring 126 completes the circuit through the line 129, a portion of the line 128, the armature 122, the bar 120, the line 134, magnetic switch 135, and thence through the lines 136, 133 and 71 to the negative side of the main supply line. Passage of the current through this circuit will effect movement of the contact member of said switch into engagement with the contact member to which the line 137 is connected. At this time, therefore, current will flow through the armature resistance 9, the bars 13 and 14, a portion of the line 15, line 137, through the magnetic switch 135, line 140 and a portion of the line 109 to the motor 25, and thence through the line 27 to the negative side of the main supply line. It will be seen that by this means the resistance 16 previously referred to is shunted so that sufficient power is supplied to the motor to increase the speed of rotation of the armature so as to return the same at once to normal speed. In the meantime the armature 56 having been operated the screw shaft 66 is being rotated in a direction to cause movement of the contact bar 20 in a direction to cut out a portion of the resistance element of the armature resistance 16. The armature 122 will remain in contact with the contact ring 126 until magnetic balance between the coils is very nearly restored when it will drop out, but the armature 56 will remain in contact with the part 60 until complete balance is effected. If when the armature 122 drops out of contact with the contact ring 126 the adjustable contact bar 20 has not had time to reach the proper segment of the armature resistance to effect magnetic balance of the coils 36 and 37 the operation will automatically be repeated and such repetition will be effected as may be necessary to restore complete balance between the two coils.

If, on the other hand, the load upon the armature of the motor is decreased a reverse operation takes place; that is to say, the adjustable contact bar 20 moves in a direction to cut in resistance. If the decrease in the load be great so as to permit relatively great increase in the speed of rotation, the left hand end of the bar 35 becomes negative or of south polarity with a field of sufficient strength to lift the armature 117 from the iron bar or block 118. Upon this occurrence the circuit through the magnetic switch 131 is interrupted or broken, in consequence of which the movable contact member of the said switch moves into position out of contact with the adjacent contact member to which the line 138 is connected. As a result the current must flow through the entire armature resistance 16 and thence through a conducting line 142 to the line 109 and thence through the latter to the motor 25. It will be seen that such an operation operates to quickly cut in the resistance to decrease the speed of operation of the motor. At the same time the armature 52 has been moved into contact with the member 59 so that the switch comprising the members 79 and 82 is operated to cause operation of the motor at 69 in a direction to in turn cause rotation of the rotatable shaft 66 to effect downward movement of the contact bar 20 thereby cutting in resistance.

The armature 117 will remain in open position; that is, out of contact with the bar or block 118, until magnetic balance between the coils 36 and 37 is very nearly restored or established, such restoration being effected by adjustment of the contact bar 20 in the manner as previously described.

If when the armature 117 drops into contact with the bar or block of iron 118 the contact bar 20 has not had time to reach the proper segment of the armature resistance 16 for effecting magnetic balance between the coils 36 and 37 the operation will be automatically repeated and such repetition continued as often as may be necessary to restore complete balance between these coils. Complete balance having been restored the normal operation continues until another change occurs in the load conditions so as to cause a change in the speed of rotation of the armature of the motor 25.

It is to be remembered that the armatures 52, 56, 117 and 122 are at all times positive or of north polarity. It follows, therefore, that only one of the armatures of each of these couples is operated upon a change of load conditions or upon a change in the speed of operation of the armature of the motor 25. The armatures adjacent the end of the bar 35 which becomes negatively charged or of south polarity are the ones which are operated. The other armatures at such time being in adjacent relation to the positive end of the bar 35 not only are not attracted toward the same but on the contrary are repelled and are more positively than ever held in position against the bars or blocks of iron with which they normally contact.

It will be seen that by my invention I have provided means which is simple, positive and efficient in action for automatically maintaining the rotation of the armature of a motor at a constant predetermined or selected speed less than its rated speed under varying load conditions.

It will also be seen that I have provided a controller which is simple in construction and which is caused to function by a variation in the speed of rotation of the armature of a motor or the like to cause the speed of rotation of said armature to return to the normal selected rate desired. Although I have shown my invention as applied to a single direct current shunt motor for controlling the speed of rotation of the armature thereof, yet it will be understood that it may be employed in connection with a plurality of such motors arranged in co-operative relation to each other; that is, arranged to operate or handle a common load, and it will be understood also that the invention is applicable to other forms of electrical devices for controlling the operation of the same, such as a slip ring alternating current motor and as a voltage regulator for an alternating current generator for the purpose of maintaining the same at constant voltage, etc.

Although the armatures 52, 56, 117 and 122 are described as being continuously of positive or north polarity it will be understood that they may be continuously of negative or south polarity provided other conditions of the apparatus are changed accordingly.

Having thus described my invention, what I claim and desire to secure by Letters Patent is:

1. In controlling means for electrical apparatus, the combination of an armature resistance comprising an adjustable element, means for adjusting said element, a stationary magnetizable bar, two coils wound in opposite directions upon said bar, means for supplying currents of electricity to said coils, the currents therethrough normally being equal and the current through one of said coils being variable, and means interposed between the said magnetizable bar and the said adjustable element for controlling the operation of said element.

2. In means for maintaining the speed of rotation of the armature of a motor at a predetermined rate under varying load conditions, the combination of an armature resistance comprising an adjustable contact element, means for causing movement of said contact element in one direction or the other depending upon whether the speed of rotation of said armature is increased or decreased, a controller including a magnetizable bar, coils wound around said bar in opposite directions, the said coils being included in separate circuits, and the energy of the currents flowing through said coils being equal when the armature of the motor is rotating at the predetermined rate of speed selected, and the said bar adapted to become magnetized upon a change of the current energy in one of the said coils, armatures located adjacent the opposite ends of said bar, said armatures being positively magnetized at all times, and means interposed between the said armatures and the adjoining opposing ends of the said bar which are adapted to be actuated upon a change in the energy of current flowing through one of said coils, whereby movement of the said adjustable contact element is effected so that the said armature is caused to resume its predetermined selected speed of rotation.

3. In controlling means for electrical apparatus, the combination of an electrical device having a rotatable member the speed of which is adapted to be maintained at a predetermined constant rate, a resistance means comprising an adjustable contact member, means rendered operative upon variation of the speed of rotation of said rotatable member to effect adjustment of the said adjustable contact member in the required direction, and means adapted to be operated simultaneously to provide a line in shunt relation to the said resistance means for supplying current to the said electrical device.

4. In controlling means for electrical apparatus, the combination of a direct current shunt motor, means including armature resistance for conditioning the apparatus to cause rotation of the armature of said motor at a predetermined selected rate of speed under varying load conditions, said armature resistance including an adjustable element, means adapted to be rendered operative upon a variation in the speed of rotation of the said armature to readjust the adjustable element of said armature resistance to recondition the said apparatus to cause the said armature to resume its predetermined selected speed of rotation, and means simultaneously operative to provide a line in shunt relation to said armature resistance for supplying current to the said armature during the period of adjustment of the said adjustable element of the armature resistance.

5. Means for maintaining the rotation of the rotatable element of an electrical device at a predetermined selected rate of speed, comprising, in combination, said rotatable element, a controller including a magnetizable bar, means for effecting magnetization of said bar upon a change in the speed of rotation of the said rotatable element, the polarities of the opposite ends of said bar depending upon whether the speed of rotation is increased or diminished, and means adapted to be operated upon the magnetization of said bar to cause the rotatable element of said device to resume its predetermined selected speed of rotation.

6. Means for maintaining the rotation of the rotatable element of an electrical device at a predetermined selected rate of speed, comprising, in combination, said rotatable element, a controller including a magnetizable bar, means rendered operative by a change in the rate of speed in the rotation of said rotatable element to magnetize said bar, the polarities of the opposite ends depending upon whether the speed of rotation has increased or diminished, movable armatures of north polarity located in adjacent relation to the opposite ends of said magnetizable bar, and circuits controlled by the movements of said armatures for reconditioning the said apparatus to cause the said rotatable element to resume its predetermined selected speed of rotation.

7. Means for maintaining the rotation of the rotatable element of an electrical device at a predetermined selected rate of speed, comprising controlling means having in combination a magnetizable bar, means rendered operative upon a change in the speed of rotation of the said rotatable element for magnetizing the said bar, the polarities of the opposite ends thereof depending upon whether the speed of rotation of said element is increased or diminished, movable armatures of north polarity located in adjacent relation to the opposite ends of the said bar, blocks of magnetizable metal located in adjacent relation to the said armatures for normally holding them away from the said magnetizable bar, contact members interposed between the said armatures and the adjacent end portions of the said bar with which an armature is adapted to contact when it is caused to move toward an end of said bar of south polarity, circuits adapted to be closed by the movements of said armatures into contact with said contact members, and means adapted to be actuated upon the completion of either of said circuits to cause the said element to resume its predetermined selected speed of rotation.

8. Means for maintaining the rotation of a rotatable element of an electrical device at a predetermined selected speed, comprising controlling means having in combination a magnetizable bar, two coils oppositely wound upon said bar, means for causing a current of constant energy to flow through one of said coils, means for causing a current to flow through the other of said coils the energy of which when the said rotatable element is rotating at the predetermined selected speed is the same as that of the current flowing through the other of said coils whereby the magnetizing effect of the said currents is neutralized, means whereby the energy of the current flowing through the second of said coils is increased or diminished upon the increasing or diminishing of the speed of rotation of the said rotatable member whereby the said bar becomes magnetized with the polarities at its opposite ends depending upon whether the speed of rotation of the said rotatable element has been increased or diminished, movable armatures supported in adjacent relation to the opposite ends of said magnetizable bar, means for maintaining the said armatures of north polarity, blocks of magnetizable metal supported in adjacent relation to said armatures and against which the said armatures are normally held, contact members interposed between the said armatures and the adjacent end portions of the magnetizable bar, circuits including the said contact members which circuits are normally open but which are adapted to be closed by the contact of the said armatures therewith when moved toward the adjacent end portion of the said bar, and means adapted to be controlled by the closing of said circuits for causing the said rotatable element to resume its predetermined selected speed of rotation.

9. In controlling means for electrical apparatus, the combination of a direct current shunt motor, conducting lines for supplying current thereto, armature resistance means for conditioning said lines to cause rotation of the armature of said motor at a predetermined selected rate of speed, said means including an adjustable element, a magnetizable bar, a circuit supplied with current from said supply lines, said circuit including a coil wound around the said magnetizable bar and also including a rheostat for controlling and maintaining a flow of current of constant strength therethrough, a second circuit including a coil wound in an opposite direction around said magnetizable bar, said circuit being connected in shunt across the total armature resistance whereby the current therethrough increases or diminishes depending upon the increase or decrease of the speed of rotation of the armature of said motor whereby the said bar may be magnetized, the polarities of its opposite ends depending upon whether the energy of the current through the second named coil is greater or less than the energy of the current through the first named coil, movable armatures located in adjacent relation to the opposite ends of the said bar which armatures are of north polarity, blocks of magnetizable metal located in adjacent relation to said armatures for normally holding them against movement toward the adjacent end portions of the said bar, contacts between said armatures and the adjacent end portions of said bar, separate circuits including said contact members as parts thereof, which circuits are normally open but one or the other of which is adapted to be closed by the movement of one of the said armatures depending upon whether the speed of rotation of the armature of said motor is increased or diminished, and means adapted to be controlled and actuated by the completion of said circuits for adjusting the adjustable element of said armature resistance in a direction to cause the said armature to resume its predetermined selected speed of rotation.

10. In controlling means for electrical apparatus, the combination of a motor, an iron core, a couple of coils thereon wound in different directions, means for providing an electric current of constant energy through one of said coils, means for providing a current of equal energy through the other of said coils when said motor is operating at a predetermined selected speed, means whereby the energy of the current through the last mentioned coil is varied upon variation of the speed of operation of said motor whereby the said core is magnetized, the polarity of the opposite ends thereof depending upon whether the speed of operation of said motor is increased or diminished, and means whereby the changes in magnetization of said core, due to a variation of current energy through the said last mentioned coil, are adapted to cause the operation of said motor to return to the predetermined speed selected.

In testimony that I claim the foregoing as my invention, I have hereunto signed my name this 12th day of March, A. D., 1925.

PIUS A. TOPPER.